Feb. 9, 1960 M. L. SASSLER 2,924,706

SYNCHRONOUS DETECTOR SYSTEM

Filed Oct. 10, 1957

Inventor
MARVIN L. SASSLER
By [signature]
Attorney

United States Patent Office 2,924,706

Patented Feb. 9, 1960

2,924,706

SYNCHRONOUS DETECTOR SYSTEM

Marvin L. Sassler, Preakness, N.J., assignor to International Telephone and Telegraph Corporation, Nutley, N.J., a corporation of Maryland Application October 10, 1957, Serial No. 689,390

2 Claims. (Cl. 250—20)

This invention refers to a synchronous detector system and more particularly to a synchronous detector system for double sideband suppressed carrier communication system.

Suppressed carrier communication systems are of great interest and value because of the substantial saving in power that they make possible. Although single sideband suppressed carrier has been emphasized as a logical replacement for amplitude modulation, there are advantages that accrue in the use of double sideband suppressed carrier. It is much less costly to convert existing amplitude modulation equipment to double sideband suppressed carrier operation than to single sideband suppressed carrier operation. Single sideband has no power advantage over the double sideband system, and single sideband is more susceptible to jamming. However, it is necessary to have more efficient detection methods in the amplitude modulation receiver than the heterodyne system. Detection methods have been suggested which required the use of a phase lock oscillator and a synchronous or coherent detector, but in such instances the phase comparison has been obtained from the audio output. This method has a disadvantage of causing a large signal-to-noise ratio. Another major problem involved in the reception of double sideband suppressed carrier modulation is the addition of a locally generated carrier to the sidebands in the correct phase and frequency. Frequency instability in either the transmitter or receiver further complicates this problem.

It is an object of this invention to provide a synchronous detector system for a double sideband suppressed carrier receiving system having a low signal-to-noise ratio.

It is a further object to provide a system for locking a locally generated carrier to a double sideband suppressed carrier signal in the correct phase and frequency.

A feature of this invention is a circuit to which is fed input radio frequency signals containing upper and lower sidebands symmetrically disposed on each side of the suppressed carrier frequency. The circuit contains an oscillator which generates a signal of a different frequency from the suppressed carrier frequency, means to combine the input signals with the generated different frequency signal to derive an output of first pairs of signals, one of the first pairs containing upper and lower sidebands symmetrically disposed on each side of the difference of the suppressed carrier frequency and the different frequency, and the other of the first pairs containing upper and lower sidebands symmetrically disposed on each side of the sum of the suppressed carrier frequency and the different frequency. Means are provided to generate a carrier frequency corresponding to the suppressed carrier frequency and to combine each of the first pairs of signals with the generated carrier frequency to obtain second pairs of signals, each of said second pairs containing upper and lower sideband signals symmetrically disposed on each side of the different frequency and having substantially the same band of frequencies.

A further feature is that means are provided to compare each of the second pairs of signals with the other to obtain an error signal proportional to the phase difference between each of the second signal pairs and means responsive to the error signal to correct the frequency of the carrier generating means to coincide with the suppressed carrier frequency. Means are further provided to combine the input signals with the generated carrier frequency to synchronously detect the modulation signals when the frequency of the carrier frequency generating means coincides with the suppressed carrier frequency.

The above-mentioned and other features and objects of this invention will become more apparent by reference to the following description taken in conjunction with the accompanying drawings, in which.

Figure 1:
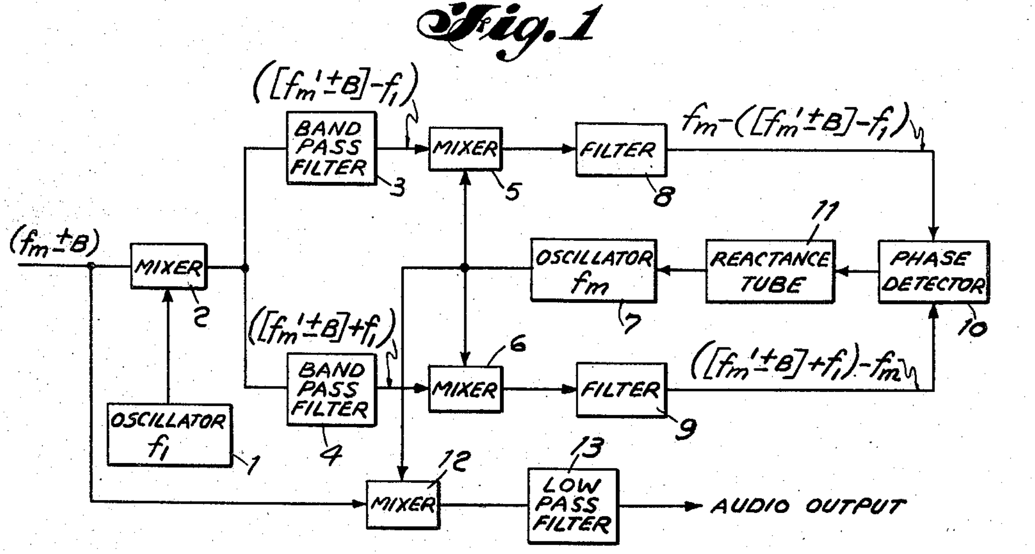
Fig. 1 is a block diagram of the circuit of this invention.

Referring to Fig. 1, there is shown an oscillator 1, which is coupled to a mixer 2. A source of input double sideband suppressed carrier signals is also coupled to mixer 2. The heterodyned output of mixer 2 is fed to a first band-pass filter 3 and a second band-pass filter 4. Filter 3 is coupled to a second mixer 5, and filter 4 is coupled to a third mixer 6. A second oscillator 7 is coupled to both mixers 5 and 6. The output of mixer 5 is conducted to a filter 8, and the output of mixer 6 is fed to a filter 9. The outputs of both filters 8 and 9 are fed into a phase detector 10, which is coupled to a reactance tube 11. The output of the reactance tube 11 is fed into the oscillator 7. The output of oscillator 7 is also coupled to a fourth mixer 12 to which is also fed the input double sideband suppressed carrier signals. The output of the mixer 4 is fed into a low-pass filter to secure an audio output.

Figure 2:
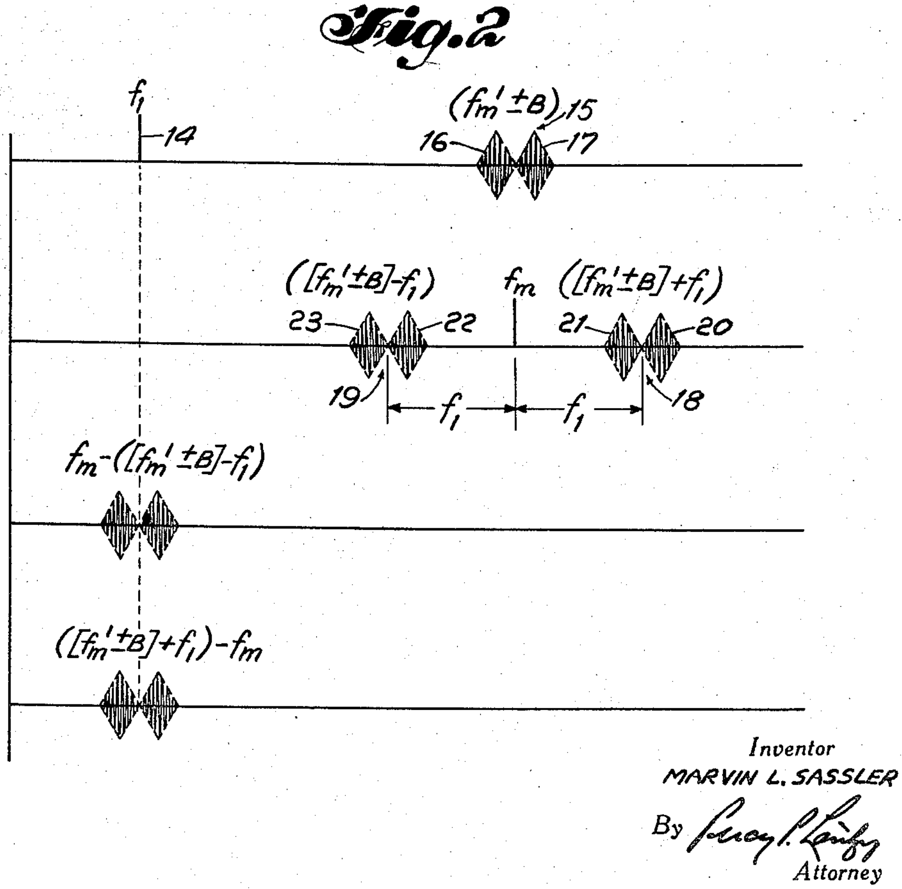
Fig. 2 is a graph of the sideband distribution obtained in the operation of this invention.

The system operates in the following manner. A double sideband suppressed carrier signal is heterodyned with the output frequency $f_1$ of the local oscillator which is of a lower frequency than the suppressed carrier frequency $f_m'$. In Fig. 2 are shown the relative positions of the generated signal 14 ($f_1$), and the double sideband suppressed carrier signal 15 ($f_m'\pm B$), of which $f_m'$ is the suppressed carrier frequency and B is the modulation intelligence. Waveform 15 has a lower sideband 16 and an upper sideband 17 centered about the frequency $f_m'$. The signal 15 is heterodyned with the signal 14 resulting in the modulation products $([f_m'\pm B]+f_1)$ shown as waveform 18 and $([f_m'\pm B]-f_1)$ as waveform 19. Waveform 18 contains upper sideband 20 and lower sideband 21 centered about the summation frequency $f_m'+f_1$. Waveform 19 contains upper sideband 22 and lower sideband 23 centered about the difference frequency $f_m'-f_1$. The higher frequency signal $([f_m'\pm B]+f_1)$ is fed into mixer 6 after passing through the band-pass filter 4. The lower frequency signal $([f_m'\pm B]-f_1)$ is fed into mixer 5 after passing through the filter 3. Locally generated carrier $f_m$, shown in position 24 in Fig. 2, which is the output of the oscillator 7, is fed directly to mixers 5 and 6. The output of filter 9 is the signal $$([f_m'\pm B]+f_1)-f_m$$

the output of filter 8 is the signal $f_m-([f_m'\pm B]-f_1)$. When $f_m\equiv f_m'$ or when $f_m$ is identical with $f_m'$ in frequency and phase, the output of mixer 5 is absolutely equal to the output of mixer 6 in frequency and phase.

The outputs of mixers 5 and 6 are fed into the phase detector 10. The phase detector 10 has zero output when the inputs are in the same phase; when they are out of phase, an error voltage results which is fed into the reactance tube 11 and provides a means for controlling the oscillator 7.

The effects of drift in the transmitter frequency may be shown by adding a phase shift $\delta$ to the double sideband suppressed carrier signal. The outputs of mixers 5 and 6 then become $E \sin(2\pi t[f_m - f_m' + f_1] - \delta)$ and $$E \sin(2\pi t[f_m' - f_m + f_1] + \delta)$$

respectively. The output of mixer 5 has undergone a negative phase shift while the output of mixer 6 has made a positive phase shift. The output of the phase detector 16 will then be of such a polarity to cause a change in frequency $f_m$ that will correct the phase difference between the outputs of mixers 5 and 6. Thus a locally generated carrier has been made to respond to variations in transmitter phase and frequency so as to lock itself to a double sideband suppressed carrier signal in the correct phase and frequency. The locally generated carrier is then heterodyned with the original double sideband suppressed carrier signal in mixer 12 and the sideband intelligence is reproduced.

Another advantage of this system is that its operation is not affected by a small degree of instability in the oscillator generating the different frequency. This may be seen by examination of the second pairs of signals. Let $\Delta f_1$ be an error in the frequency of $f_1$.

Then:

$$f_m - ([f_m' \pm B]) - (f_1 \pm \Delta f_1) \equiv ([f_m' \pm B] + [f_1 \pm \Delta f_1]) - f_m$$

While I have described above the principles of my invention in connection with specific apparatus, it is to be clearly understood that this description is made only by way of example and not as a limitation to the scope of my invention as set forth in the objects thereof and in the accompanying claims.

I claim:

1. A synchronous detector system for double side-band suppressed carrier frequency signals, comprising a source of input radio frequency signals containing upper and lower sidebands symmetrically disposed on each side of the transmitted suppressed carrier frequency, means to generate a frequency different from the suppressed carrier frequency, means to combine said input signals with said different frequency to obtain first pairs of signals, one of said first pairs containing upper and lower sidebands symmetrically disposed on each side of the difference of said suppressed carrier frequency and said different frequency and the other of said first pairs containing upper and lower sidebands symmetrically disposed on each side of the sum of said suppressed carrier frequency and said different frequency, means to generate a carrier frequency corresponding to said suppressed carrier frequency, means to combine each of said first pairs of signals with said generated carrier frequency to obtain second pairs of signals, each of said second pairs containing upper and lower side-band signals symmetrically disposed on each side of said different frequency and having substantially the same band of frequencies, means to compare each of said second pairs of signals with the other to obtain an error signal proportional to the phase difference between each of said second signal pairs, means to apply said error signal to correct the frequency of said carrier frequency generating means to coincide with the suppressed carrier frequency of said input signals, means to combine said input signals with said generated carrier frequency to synchronously detect therefrom the modulation signals of said input signals when the frequency of said carrier frequency generating means coincides with the suppressed carrier frequency of said input signals.

2. In a circuit of the character described, a source of input radio frequency signals containing upper and lower sidebands symmetrically disposed on each side of the transmitted suppressed carrier frequency, means to generate a frequency different from the suppressed carrier frequency, means to combine said input signals with said different frequency to obtain first pairs of signals, one of said first pairs containing upper and lower sidebands symmetrically disposed on each side of the difference of said carrier frequency and said different frequency and the other of said first pairs containing upper and lower sidebands symmetrically disposed on each side of the sum of said suppressed carrier frequency and said different frequency, means to generate a carrier frequency corresponding to said suppressed carrier frequency, means to combine each of said first pairs of signals with said generated carrier frequency to obtain second pairs of signals, each of said second pairs containing upper and lower side-band signals symmetrically disposed on each side of said different frequency and having substantially the same band of frequencies, means to compare each of said second pairs of signals with the other to obtain an error signal proportional to the phase difference between each of said second signal pairs, and means to apply said error signal to correct the frequency of said carrier frequency generating means to coincide with the suppressed carrier frequency of said input signals.

References Cited in the file of this patent

FOREIGN PATENTS

| | | |
|---|---|---|
| 663,664 | Great Britain | Dec. 27, 1951 |
| 669,113 | Great Britain | Mar. 26, 1952 |